(12) United States Patent
Onishi et al.

(10) Patent No.: US 8,479,572 B2
(45) Date of Patent: Jul. 9, 2013

(54) BUBBLE COLUMN TYPE HYDROCARBON SYNTHESIS REACTOR, AND SLURRY LEVEL DETECTING METHOD

(75) Inventors: Yasuhiro Onishi, Tokyo (JP); Yuzuru Kato, Tokyo (JP); Eiichi Yamada, Tokyo (JP)

(73) Assignees: Nippon Steel Engineering Co. Ltd., Tokyo (JP); Japan Oil, Gas and Metals National Corporation, Kanagawa (JP); Inpex Corporation, Tokyo (JP); Nippon Oil Corporation, Tokyo (JP); Japan Petroleum Exploration Co., Ltd., Tokyo (JP); Cosmo Oil Co., Ltd., Tokyo (JP)

( * ) Notice: Subject to any disclaimer, the term of this patent is extended or adjusted under 35 U.S.C. 154(b) by 509 days.

(21) Appl. No.: 12/733,892

(22) PCT Filed: Sep. 26, 2008

(86) PCT No.: PCT/JP2008/067427
§ 371 (c)(1),
(2), (4) Date: Apr. 23, 2010

(87) PCT Pub. No.: WO2009/041579
PCT Pub. Date: Apr. 2, 2009

(65) Prior Publication Data
US 2010/0242594 A1    Sep. 30, 2010

(30) Foreign Application Priority Data

Sep. 27, 2007 (JP) ................................. 2007-252522

(51) Int. Cl.
*G01F 23/14* (2006.01)
(52) U.S. Cl.
USPC .................................. 73/299; 73/292; 73/149

(58) Field of Classification Search
USPC ............................................ 73/149, 292, 299
See application file for complete search history.

(56) References Cited

U.S. PATENT DOCUMENTS 3,250,123 A    5/1966  Clayton
3,620,085 A   11/1971  Khoi
(Continued)

FOREIGN PATENT DOCUMENTS

CN    85102390     2/1987
JP    48-053762    7/1973
(Continued)

OTHER PUBLICATIONS

International Search Report dated Jan. 13, 2008 issued in corresponding PCT Application No. PCT/JP2008/067427.

(Continued)

*Primary Examiner* — Hezron E Williams
*Assistant Examiner* — Paul West
(74) *Attorney, Agent, or Firm* — Kenyon & Kenyon LLP

(57) ABSTRACT

There is provided a bubble column type hydrocarbon synthesis reactor which synthesizes a hydrocarbon compound by a chemical reaction of a synthesis gas including hydrogen and carbon monoxide as main components, and a slurry having solid catalyst particles suspended in liquid. The hydrocarbon synthesis reactor includes a reactor main body which accommodates the slurry, a synthesis gas supplying section which supplies the synthesis gas to the slurry; one pressure sensor which is arranged higher than the liquid level of the slurry to measure the pressure of the synthesis gas above the liquid level, another pressure sensor which is arranged lower than the liquid level of the slurry to measure the pressure of the slurry, and a liquid level detecting device which detects a liquid level position of the slurry on the basis of measurement results of the pressure sensors. A plurality of the other pressure sensors are provided at arbitrary intervals in an axial direction of the reactor main body.

5 Claims, 3 Drawing Sheets

U.S. PATENT DOCUMENTS

| | | | |
|---|---|---|---|
| 4,098,339 A | 7/1978 | Weisz et al. | |
| 4,888,989 A | 12/1989 | Homer | |
| 5,325,716 A * | 7/1994 | Hafner et al. | 73/301 |
| 6,160,026 A | 12/2000 | Dai et al. | |
| 7,032,449 B2 * | 4/2006 | Rivas P. | 73/438 |
| 2003/0018089 A1 | 1/2003 | Schweitzer et al. | |
| 2004/0016457 A1 | 1/2004 | Bolland | |
| 2004/0021080 A1 | 2/2004 | Bidell et al. | |
| 2006/0070438 A1 | 4/2006 | Hatfield et al. | |
| 2007/0014703 A1 | 1/2007 | Schweitzer et al. | |

FOREIGN PATENT DOCUMENTS

| | | |
|---|---|---|
| JP | 49-36266 | 9/1974 |
| JP | 60-147230 | 8/1985 |
| JP | 62-047520 | 3/1987 |
| JP | 06-032626 | 2/1994 |
| JP | 07-035598 | 2/1995 |
| JP | 2001-517645 | 10/2001 |
| JP | 2004-61512 | 2/2004 |

OTHER PUBLICATIONS

Japanese Office Action dated Sep. 25, 2012, issued in corresponding Japanese Application No. 2009-534408, and an English translation thereof.

Chinese Office Action dated Aug. 17, 2012, issued in corresponding Chinese Application No. 200880108686.9, and an English translation thereof.

* cited by examiner

BUBBLE COLUMN TYPE HYDROCARBON SYNTHESIS REACTOR, AND SLURRY LEVEL DETECTING METHOD

This application is a national stage application of International Application No. PCT/JP2008/067427, filed 26 Sep. 2008, which claims priority to Japanese Application No. 2007-252522, filed 27 Sep. 2007 which is incorporated by reference in its entirety.

TECHNICAL FIELD

The present invention relates to a bubble column type hydrocarbon synthesis reactor for synthesizing a hydrocarbon compound by introducing a synthesis gas which is mainly composed of hydrogen and carbon monoxide into a slurry having solid catalyst particles suspended in a liquid hydrocarbon, and relates to a slurry level detecting method within the bubble column type hydrocarbon synthesis reactor.

BACKGROUND ART OF THE INVENTION

As the reaction systems of a Fischer-Tropsch synthesis reaction (hereinafter called FT synthesis reaction) that generates a hydrocarbon compound and water by catalytic reaction from a synthesis gas which is mainly composed of hydrogen and carbon monoxide, a bubble column type slurry bed FT synthesis reaction system that carries out an FT synthesis reaction by introducing a synthesis gas into a slurry in which solid catalyst particles are suspended in a liquid hydrocarbon is available (for example, refer to Patent Document 1 and 2 as mentioned below). Further, a hydrocarbon compound synthesized by the FT synthesis reaction is mainly utilized as a raw material for liquid fuel products such as naphtha (rough gasoline), kerosene and gas oil. Further, a hydrocarbon compound synthesized by the FT synthesis reaction is mainly utilized as a raw material for liquid fuel products such as naphtha (rough gasoline), kerosene and gas oil.

In the bubble column type slurry bed FT synthesis reaction system, a synthesis gas introduced into the slurry ascends through the slurry as bubbles. In order to control the reaction state between catalyst particles and the synthesis gas in a state (operating state) where the synthesis gas is stably supplied into the slurry, it is necessary to know the concentration of the catalyst particles included in the slurry. However, since the amount of liquid hydrocarbons included in the slurry increases by an FT synthesis reaction, the concentration of the catalyst particles will change with this increase. Accordingly, when the reaction state is controlled, it is necessary to detect the liquid level position of the slurry serving as an index of the amount of the liquid hydrocarbons.

In addition, as a conventional liquid level detecting method, there is a method utilizing a float on the liquid level, for example, as disclosed in Patent Document 3, or a so-called capacitive method of making water or slurry including solid function as a component of a capacitor to thereby detect the liquid level (interface of gas and liquid) of water or slurry, for example, as disclosed in Patent Document 4. Further, as the conventional liquid level detecting method, there is a method of measuring the pressure of liquid accommodated in a vessel, the pressure of gas above the liquid level within the vessel, and the temperature of the liquid, and obtaining a liquid level position using the difference (differential pressure) between the two measured pressures, the distance between the two pressure detection positions, the specific gravity of the liquid calculated on the basis of the measured pressures and measured temperatures, etc., for example, as disclosed in Patent Document 5.

PATENT DOCUMENT 1: US Patent Application, First Publication No. 2003/0018089
PATENT DOCUMENT 2: US Patent Application, First Publication No. 2007/0014703
PATENT DOCUMENT 3: US Patent Application, First Publication No. 2004/0021080
PATENT DOCUMENT 4: U.S. Pat. No. 4,888,989
PATENT DOCUMENT 5: US Patent Application, First Publication No. 2006/0070438

DETAILED DESCRIPTION OF THE INVENTION

Problems to be Solved by the Invention

However, in the FT synthesis reaction; the synthesis gas (gas) is introduced into the slurry consisting of the liquid hydrocarbons (liquid) and the catalyst particles (solid). Therefore, the slurry makes a complicated dispersed system including three phases of gas, liquid, and solid along with the synthesis gas which exists in the slurry as bubbles. Further, since it may be difficult to determine the liquid level of the slurry due to the bubbles (synthesis gas) which ascend through the slurry, and the physical properties of the slurry, such as density and viscosity, may change depending on the conditions of the FT synthesis reaction, the above conventional liquid level detecting method has a problem in that it is difficult to detect the liquid level position of the slurry.

The present invention suggests an optimal slurry level detecting method capable of easily detecting the liquid level position of a slurry, in a bubble column type hydrocarbon synthesis reactor which accommodates the slurry which forms a complicated dispersed system including three phases of gas, liquid, and solid, and aims at utilizing this method for controlling the reaction state between catalyst particles and synthesis gas.

Means for Solving the Problems

The bubble column type hydrocarbon synthesis reactor of the present invention is a bubble column type hydrocarbon synthesis reactor which synthesizes a hydrocarbon compound by a chemical reaction of a synthesis gas including hydrogen and carbon monoxide as main components, and a slurry having solid catalyst particles suspended in liquid. The hydrocarbon synthesis reactor includes a reactor main body which accommodates the slurry; a synthesis gas supplying section which supplies the synthesis gas to the slurry; one pressure sensor which is arranged higher than the liquid level of the slurry to measure the pressure of the synthesis gas above the liquid level; another pressure sensor which is arranged lower than the liquid level of the slurry to measure the pressure of the slurry; and a liquid level detecting device which detects a liquid level position of the slurry on the basis of measurement results of the pressure sensors. A plurality of the other pressure sensors are provided at arbitrary intervals in an axial direction of the reactor main body.

According to the bubble column type hydrocarbon synthesis reactor related to the present invention, the liquid level position of the slurry which makes a complicated dispersed system including three phases of gas, liquid, and solid can be easily detected by implementing a slurry level detecting method to be described later, in the liquid level detecting device.

The slurry level detecting method of the present invention is a slurry level detecting method comprising the steps of: measuring a differential pressures $\Delta P_n$ (n and m are positive integers, n=1, 2, ..., m−1, and m, and m≧3) between the pressure of the synthesis gas above the liquid level of the slurry and the pressures of the slurry at a plurality of depth positions which are different from the liquid level; calculating a volume fraction $\epsilon_n$ of the synthesis gas between the pressure measurement positions of the slurry which are adjacent to each other, according to the following Equation:

$$\Delta P_n - \Delta P_{n-1} = \rho_{SLn} \times L_n \times (1-\epsilon_n)$$

n and m are positive integers, n=2, 3, ..., m−1, m, on the basis of a plurality of the differential pressures $\Delta P_n$, the axial distance $L_n$ between the pressure measurement positions of the slurry which are adjacent to each other, and the density $\rho_{SLn}$ of the slurry between the pressure measurement positions of the slurry which are adjacent to each other, on the definition that a differential pressure between the pressure of the synthesis gas and the pressure of the slurry measured in a first measurement position nearest from the liquid level is defined as $\Delta P_1$, and as "n" is greater, the depth from the liquid level becomes greater; calculating a volume fraction $\epsilon_1$ of the synthesis gas between the first measurement position and the liquid level on the basis of the volume fraction $\epsilon_n$ of the synthesis gas; and obtaining a distance h from the first measurement position to the liquid level according to the following Equation:

$$\Delta P_1 = \rho_{SL1} \times h \times (1-\epsilon_1),$$

on the basis of the volume fraction $\epsilon_1$, the differential pressure $\Delta P_1$, and the density $\rho_{SL1}$ of the slurry between the first measurement position and the liquid level.

According to the liquid level detecting method of the slurry related to the present embodiment, by taking into consideration the volume fractions of the synthesis gas and utilizing the plurality of differential pressures to thereby detect the liquid level position of the slurry, the liquid level position of the slurry having three phases of gas including a synthetic gas which exists in a slurry as bubbles, liquid and solid can be easily detected with high precision.

Further, the slurry level detecting method of the present invention is a slurry level detecting method comprising the steps of: measuring a differential pressures between the pressure of the synthesis gas above the liquid level of the slurry and the pressures of the slurry at a plurality of depth positions which are different from the liquid level; carrying out linear approximation on the basis of the relationship between the differential pressure and each of the pressure measurement positions of the slurry; and setting a position where the differential pressure is 0 by using the equation decided by the linear approximation to the liquid level position. In addition, in this slurry level detecting method, for example, it is desirable that the liquid level position be detected on the basis of one pressure measurement position of the slurry.

Also, according to this slurry level detecting method, only by measuring the differential pressures between the pressure of the synthesis gas and the pressures of the slurry, the liquid level position of the slurry including three phases of gas, liquid, and solid can be detected easily, without considering influences of the density of the slurry, the volume fraction of the synthesis gas, or the like. Further, since there is no need to obtain the densities of the slurry, or the volume fractions of the synthesis gas, it becomes possible to rapidly detect the level position.

Also, in the shiny level detecting method, the density of the slurry may be obtained on the basis of the composition of the slurry and the temperature of the slurry may be measured, and the density of the slurry may be corrected on the basis of the temperature of the slurry.

Further, the bubble column type hydrocarbon synthesis reactor may further include a temperature sensor which measures the temperature of the slurry. The liquid level detecting device may correct the density of the slurry obtained on the basis of the composition of the slurry with a measurement result of the temperature sensor, and may detect the liquid level position of the slurry on the basis of the corrected density of the slurry and the measurement results of the pressure sensors.

According to the slurry level detecting method and the bubble column type hydrocarbon synthesis reactor, by correcting the densities of the slurry on the basis of the temperatures of the slurry, the liquid level position of the slurry can be detected with high precision, even if the temperatures of the slurry when the densities of the slurry are obtained from the compositions of the slurry differ from one another.

Further, in the slurry level detecting method, the density of the slurry may be obtained on the basis of the composition of the slurry and the temperature of the slurry may be measured, in every section existing between by the pressure measurement positions of the slurry which are adjacent to each other in the reactor main body, and on the basis of the temperature of the slurry in each section, the density of the slurry in the section corresponding to the temperature may be corrected individually.

Moreover, in the bubble column type hydrocarbon synthesis reactor, temperature sensors which measure the temperatures of the slurry may be respectively provided within sections existing between the other pressure sensors which are adjacent to each other in the reactor main body, and the liquid level detecting device may individually correct the density of the slurry obtained on the basis of the composition of the slurry within each of the sections with a measurement result of the temperature sensor arranged in the section corresponding to the density, and may detect a liquid level position of the slurry on the basis of the corrected density of the slurry and the measurement results of the pressure sensors.

According to the slurry level detecting method and the bubble column type hydrocarbon synthesis reactor, the liquid level position of the slurry can be detected with higher precision by individually correcting the density of the slurry in each section depending on the temperature of the slurry in each section.

Further, in the bubble column type hydrocarbon synthesis reactor, a plurality of auxiliary temperature sensors which measure temperatures within the reactor main body may be arranged side by side in the axial direction of the reactor main body, in the vicinity of the liquid level in a state where the synthesis gas is stably supplied to the slurry by the synthesis gas supplying section, and the liquid level detecting device may detect the liquid level position of the slurry on the basis of measurement results of the plurality of auxiliary temperature sensors, during a period between a state where the synthesis gas is not supplied into the slurry and a state where the synthesis gas is stably supplied into the slurry after starting supply of the synthesis gas.

That is, the liquid level position of the slurry changes greatly during the period from a state (static state) where the synthesis gas is not supplied into the slurry to a state (operating state) where the supply of the synthesis gas is started (start of operation) and the synthesis gas is stably supplied into the slurry. Further, the difference between the temperature of the slurry and the temperature of the synthesis gas above the liquid level in an operating state is large as compared with the temperature difference within the slurry.

Thus, by measuring the temperature within the reactor main body using the plurality of auxiliary temperature sensors mentioned above at the time of start of the operation of the bubble column type hydrocarbon synthesis reactor, the change of the liquid level of which the temperature change is large can be known according to the arrangement of the auxiliary temperature sensors which measure a large temperature change, and whether the synthesis reaction system is in an operating state can be determined. Also, in a case where it is determined that the synthesis reaction system is in an operating state, it becomes possible to start the aforementioned liquid level detection.

That is, according to this bubble column type hydrocarbon synthesis reactor, the timing with which the liquid level detection is started can be determined easily.

ADVANTAGEOUS EFFECTS OF THE INVENTION

According to the present invention, the liquid level position of the slurry which makes a complicated dispersed system including three phases of gas, liquid, and solid can be detected easily.

DESCRIPTION OF THE REFERENCE SYMBOLS

3: REACTOR (BUBBLE COLUMN TYPE HYDROCARBON SYNTHESIS REACTOR)
10: REACTOR MAIN BODY
12: SLURRY
12a: LIQUID LEVEL
20: DISTRIBUTOR (SYNTHESIS GAS SUPPLYING SECTION)
51: PRESSURE SENSOR (ONE PRESSURE SENSOR)
52 to 55: PRESSURE SENSORS (OTHER PRESSURE SENSORS)
61 to 65: TEMPERATURE SENSORS
71: ARITHMETIC DEVICE (LIQUID LEVEL DETECTING DEVICE)
122: LIQUID HYDROCARBON (HYDROCARBON COMPOUND)
124: CATALYST PARTICLES

BEST MODE FOR CARRYING OUT THE INVENTION

Hereinafter, preferred embodiments of the present invention will be described with reference to FIGS. 1 to 3.

Figure 1:
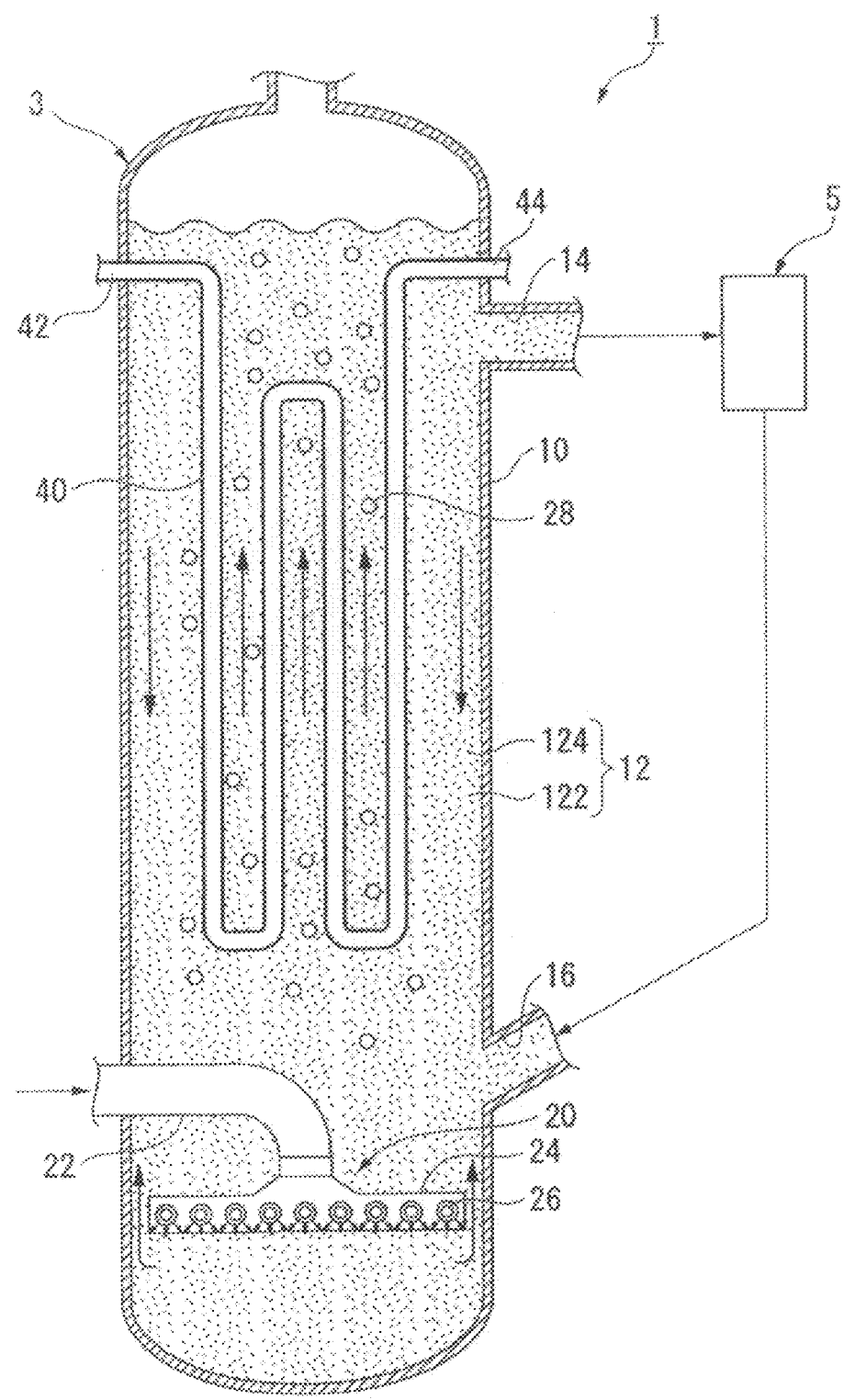
FIG. 1 is a schematic diagram showing a synthesis reaction system including a reactor according to an embodiment of the invention.

As shown in FIG. 1, a reactor (bubble column type hydrocarbon synthesis reactor) 3 according to a first embodiment of the present invention is one which causes an FT synthesis reaction, and constitutes a bubble column type slurry bed FT synthesis reaction system (synthesis reaction system) 1, along with a separator 5 which extracts products of the FT synthesis reaction.

The reactor 3 mainly comprises a reactor main body 10, a distributor 20 and a cooling tube 40. The reactor main body 10 is a roughly cylindrical vessel made of metal, the diameter of which is about 1 to 20 meters, preferably about 2 to 10 meters. The height of the reactor main body 10 is about 10 to 50 meters, preferably about 15 to 45 meters. Slurry 12 having solid catalyst particles 124 suspended in a liquid hydrocarbon (product of the FT synthesis reaction) 122 is accommodated in the interior of the reactor main body 10. The reactor main body 10 is formed with a slurry outflow port 14 through which a portion of the slurry 12 is allowed to flow out to a separator 5 from an upper portion of the reactor main body, and a slurry inflow port 16 through which the slurry 12 is allowed to flow into a lower portion of the reactor main body 10 from the separator 5.

The distributor 20, which is an example of a synthesis gas supplying section related to the present embodiment, is disposed at the lower portion inside the reactor main body 10 to supply synthesis gas including hydrogen and carbon monoxide as main components into the slurry 12. The distributor 20 is composed of a synthesis gas supply pipe 22, a nozzle header 24 attached to a distal end of the synthesis gas supply pipe 22, and a plurality of synthesis gas supply nozzles 26 provided at a side portion of the nozzle header 24.

The synthesis gas supplied through the synthesis gas supply pipe 22 from the outside passes through the nozzle header 24 and is injected into the slurry 12 inside the reactor main body 10, for example, downward (that is, the direction shown by thin arrows in the drawing) from a synthesis gas supply port (not shown) provided at the lower portion of the synthesis gas supply nozzle 26 (the bottom of the reactor main body 10). Thus, the synthesis gas introduced from the distributor 20 into the slurry 12 is made into bubbles 28 and flows through the slurry 12 from the bottom to the top in the height direction (vertical direction) of the reactor main body 10. In the process, the synthesis gas is dissolved in the liquid hydrocarbons 122 and brought into contact with the catalyst particles 124, whereby a synthesis reaction of the liquid hydrocarbon (FT synthesis reaction) is carried out. In addition, in the present embodiment, the synthesis gas is injected downward. However, the synthesis gas may be injected upward of the reactor main body 10.

Further, the synthesis gas is introduced into the slurry 12 from the distributor 20 disposed at the lower portion inside the reactor main body 10. The synthesis gas introduced into the slurry 12 is made into bubbles 28 and ascends inside the reactor main body 10. Thereby, inside the reactor main body 10, an upward flow (air lift) of the slurry 12 is generated at the central portion inside the reactor main body 10 and in the vicinity thereof (that is, in the vicinity of the center axis of the reactor main body 10), and a downward flow of the slurry 12 is generated in the vicinity of the inner wall of the reactor main body 10 (that is, in the vicinity of the inner peripheral portion). Thereby, as shown by the thick arrows in FIG. 1, a circulating flow of the slurry 12 is generated inside the reactor main body 10.

In addition, the liquid level of the slurry 12 in a state (operating state) where the synthesis gas is supplied to the slurry 12 becomes higher than the liquid level of the slurry 12 in a state (static state) where the synthesis gas is not supplied to the slurry 12.

The cooling pipe 40 is provided along the height direction of the reactor main body 10 inside the reactor main body 10 to cool down the slurry 12 whose temperature has risen due to the heat generated by the FT synthesis reaction. The cooling pipe 40 may be formed so as to reciprocate a plurality of times (for example, reciprocate two times in FIG. 2) vertically in the vertical direction, for example, by bending a single pipe as shown in FIG. 2. However, the shape and number of cooling pipes are not limited to the above shape and number, but may be such that the cooling pipes are evenly arranged inside the reactor main body 10 and contribute to uniform cooling of the slurry 12. For example, a plurality of cooling pipes having a double-pipe structure called a bayonet type may be arranged inside the reactor main body 10.

Cooling water (for example, the temperature of which is different by about −50 to 0° C. from the interior temperature of the reactor main body 10) introduced from the cooling pipe inlet 42 is caused to circulate through the cooling pipe 40. As the cooling water exchanges heat with the slurry 12 via the wall of the cooling pipe 40 in the process during which the cooling water circulates through the cooling pipe 40, the slurry 12 inside the reactor main body 10 is cooled down. A portion of the cooling water is discharged from the cooling-pipe outlet 44 as steam. In addition, the medium for cooling the slurry 12 is not limited to the cooling water as described above. For example, a straight chain and branched-chain paraffin, naphthenic hydrocarbon, olefin, low-molecular-weight silane, silyl ether, and silicone oil, etc., of $C_4$ to $C_{10}$ may be used as the medium.

Figure 2:
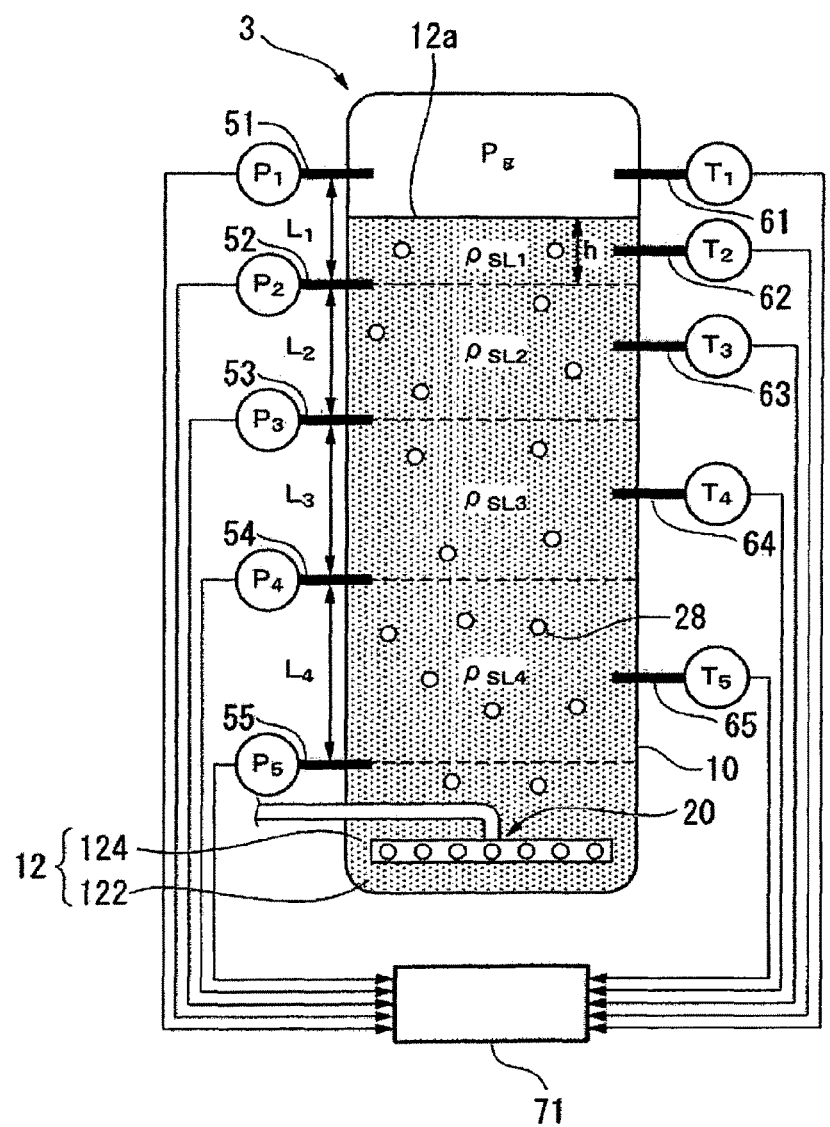
FIG. 2 is a schematic diagram showing the configuration of the reactor of FIG. 1.

Further, as shown in FIG. 2, the reactor 3 includes a plurality of pressure sensors 51 to 55 and temperature sensors 61 to 65 which are provided on the inner wall of the reactor main body 10, and an arithmetic device (liquid level detecting device) 71 which calculates to detect the liquid level position of the slurry 12 on the basis of measurement results of pressures $P_1$ to $P_5$ or temperatures $T_1$ to $T_5$, which are measured by the pressure sensors 51 to 55 or the temperature sensors 61 to 65.

The plurality of (five in the illustrated example) pressure sensors 51 to 55 are arranged at arbitrary intervals in the axial direction (height direction) of the reactor main body 10. Also, when the synthesis reaction system 1 is in an operating state, the first pressure sensor (one pressure sensor) 51 is arranged higher than a liquid level 12a of the slurry 12 to measure the pressure $P_1$ of the synthesis gas above the liquid level 12a. Further, the second to fifth pressure sensors (other pressure sensors) 52 to 55 are arranged lower than the liquid level 12a of the slurry 12 to measure the pressures $P_2$ to $P_5$ of the slurry 12. In addition, in the illustrated example, the fifth pressure sensor 55 arranged on the lowest side of the reactor main body 10 is arranged higher than the distributor 20. However, the fifth pressure sensor may be arranged, for example, in the same height position as the distributor 20, or arranged lower than the distributor 20.

The plurality of (four in the illustrated example) temperature sensors 61 to 65, similarly to the pressure sensors 51 to 55, are arranged at intervals in the axial direction of the reactor main body 10. Also, when the synthesis reaction system 1 is in an operating state, the first temperature sensor (one pressure sensor) 61 is arranged higher than the liquid level 12a of the slurry 12 to measure the temperature $T_1$ of the synthesis gas above the liquid level 12a. Further, the second to fifth temperature sensors (other temperature sensors) 62 to 65 are arranged lower than the liquid level 12a of the slurry 12 to measure the temperature $T_2$ to $T_5$ of the slurry 12.

Here, the third to fifth temperature sensors 63 to 65 are respectively arranged one by one within axial respective sections (axial distances) $L_2$, $L_3$, and $L_4$ existing between the second to fifth pressure sensors 52 to 55 which are adjacent to each other in the reactor main body 10. That is, for example, the third temperature sensor 63 can measure the temperature $T_2$ of the slurry 12 in the section $L_2$ existing between the second pressure sensor 52 and the third pressure sensor 53. In addition, each of the third to fifth temperature sensors 63 to 65 more preferably is arranged in each intermediate position of the sections $L_2$, $L_3$, and $L_4$.

Further, the second temperature sensor 62 is arranged in the position where the temperature $T_2$ of the slurry 12 below the liquid level 12a is measured within a section $L_1$ existing between the first pressure sensor 51 and the second pressure sensor 52 in the axial direction of the reactor main body 10. That is, the second temperature sensor 62 is arranged within a section existing between the second pressure sensor 52 and the liquid level 12a in the axial direction of the reactor main body 10.

As shown in FIG. 1, the separator 5 separates the liquid hydrocarbons 122 and the catalyst particles 124 of the slurry 12 which have flowed out of the reactor main body 10 via the slurry outflow port 14. Also, the slurry 12 including a number of catalyst particles 124 flows into the reactor main body 10 via the slurry inflow port 16 from the separator 5. In addition, in the present embodiment, the flow which makes the slurry 12 flow to the separator 5 out of the reactor main body 10, and the flow of the slurry 12 which is returned to the reactor main body 10 from the separator 5 are induced by the circulating flow of the slurry 12 accompanied with inside the reactor main body 10. In addition, in the illustrated example, a facility which separates the liquid hydrocarbons 122 and the catalyst particles 124 of the slurry 12 is installed outside the reactor main body 10. However, for example, the facility may be installed inside the reactor main body 10.

Next, the operation of the synthesis reaction system 1 configured in this way will be described. In a state where the synthesis reaction system 1 is operating, synthesis gas is supplied into the accommodated slurry 12, and the circulating flow of the slurry 12 is generated inside the reactor main body 10. Further, in this state, the liquid hydrocarbons 122 are synthesized by the chemical reaction between the synthesis gas and the catalyst particles 124. Moreover, the heat produced by this chemical reaction is cooled down by the cooling pipe 40.

Further, in this operating state, the liquid level 12a of the slurry 12 is located higher than the slurry outflow port 14, and a portion of the circulating flow of the slurry 12 within the reactor main body 10 is circulated from the slurry outflow port 14 via the separator 5 to the slurry inflow port 16 by the circulating flow.

Next, a method of detecting the liquid level position of the slurry 12 in a state where the synthesis reaction system 1 is operating will be described.

In the liquid level detecting method of the slurry 12 related to the present embodiment, the compositions of the slurry 12 extracted from the reactor main body 10 are analyzed in advance in the respective sections $L_1$, $L_2$, $L_3$, and $L_4$ in an operating state, whereby the densities $\rho_{SL1}$, $\rho_{SL2}$, $\rho_{SL3}$, and $\rho_{SL4}$ of the slurry 12 in the respective sections $L_1$, $L_2$, $L_3$, and $L_4$ are calculated. Further, the temperatures $T_2$, $T_3$, $T_4$, and $T_5$ of the slurry 12 in the respective sections $L_1$, $L_2$, $L_3$, and $L_4$ in the slurry 12 in an operating state are measured by the second to fifth temperature sensors 62 to 65. The densities $\rho_{SL1}$, $\rho_{SL2}$, $\rho_{SL3}$, and $\rho_{SL4}$ and temperatures $T_2$, $T_3$, $T_4$, and $T_5$ of the slurry 12 in the respective sections $L_1$, $L_2$, $L_3$, and $L_4$ are input to an arithmetic device 71.

Also, the arithmetic device 71 individually corrects the input densities $\rho_{SL1}$, $\rho_{SL2}$, $\rho_{SL3}$, and $\rho_{SL4}$ of the slurry 12 in the respective sections $L_1$, $L_2$, $L_3$, and $L_4$, on the basis of the temperatures $T_2$, $T_3$, $T_4$, and $T_5$ (measurement results of the respective temperature sensors) of the slurry 12 in the sections $L_1$, $L_2$, $L_3$, and $L_4$ corresponding to these densities.

After correction of the densities $\rho_{SL1}$, $\rho_{SL2}$, $\rho_{SL3}$, and $\rho_{SL4}$ of the slurry 12 is completed, the pressure $P_1$ of the synthesis gas and the pressures $P_2$ to $P_5$ of the slurry 12 are continuously measured by the first to fifth pressure sensors 51 to 55, and the liquid level position of the slurry 12 is continuously detected in the arithmetic device 71 on the basis of the measurement results of the first to fifth pressure sensors 51 to 55 and the densities $\rho_{SL1}$, $\rho_{SL2}$, $\rho_{SL3}$, and $\rho_{SL4}$ of the slurry 12.

At the time of this detection, firstly, the pressure $P_1$ of an unreacted synthesis gas above the liquid level 12a of the slurry 12 and the pressures $P_2$ to $P_5$ of the slurry 12 in a plurality of positions which are different from the liquid level 12a are measured by the first to fifth pressure sensors 51 to 55, and the measurement results of the first to fifth pressure sensors 51 to 55 are input to the arithmetic device 71.

Also, the arithmetic device 71 measures each differential pressure $\Delta P_n$ (n=1, 2, 3, 4) between the pressure $P_1$ of the synthesis gas, and each of the pressures $P_2$ to $P_5$ of the slurry 12.

Here, it is defined that the differential pressure between the pressure $P_1$ of the synthesis gas and the pressure $P_2$ of the slurry 12 measured by the second pressure sensor 52 in a measurement position (first measurement position) nearest from the liquid level 12a is defined as $\Delta P_1$, and as "n" is greater, the depth from the liquid level 12a becomes greater. That is, each of the differential pressures $\Delta P_1$ to $\Delta P_4$ in the present embodiment is expressed by the following Equation (1).

$$\Delta P_n = P_{n+1} - P_1 \text{ (n=1, 2, 3, 4)} \quad (1)$$

Next, the arithmetic device 71 calculates the volume fractions $\epsilon_2$, $\epsilon_3$, and $\epsilon_4$ of the synthesis gas which exists as the bubbles 28 in the respective sections $L_2$, $L_3$, and $L_4$ according to the following Equations (2) to (4):

$$\Delta P_2 - \Delta P_1 = \rho_{SL2} \times L_2 \times (1-\epsilon_2) \quad (2),$$

$$\Delta P_3 - \Delta P_2 = \rho_{SL3} \times L_3 \times (1-\epsilon_3) \quad (3),$$

$$\Delta P_4 - \Delta P_3 = \rho_{SL4} \times L_4 \times (1-\epsilon_4) \quad (4),$$

on the basis of the differential pressures $\Delta P_1$ to $\Delta P_4$, the axial distances $L_2$, $L_3$, and $L_4$ between the respective measurement positions of the pressures $P_2$ to $P_5$ of the slurry 12, and the densities $\rho_{SL2}$, $\rho_{SL3}$, and $\rho_{SL4}$ of the slurry 12 in the sections $L_2$, $L_3$, and $L_4$.

Thereafter, the arithmetic device 71 calculates the volume fraction $\epsilon_1$ of the synthesis gas which exists as the bubbles 28 between the first measurement position and the liquid level 12a, by using an average value of the respective volume fractions $\epsilon_2$, $\epsilon_3$, and $\epsilon_4$ calculated by the above Equations (2) to (4), and a least-square method, etc.

Finally, the arithmetic device 71 obtains the distance h from the first measurement position to the liquid level 12a according to the following Equation (5):

$$\Delta P_1 = \rho_{SL1} \times h \times (1-\epsilon_1) \quad (5),$$

on the basis of the volume fraction $\epsilon_1$, the differential pressure $\Delta P_1$, and the density $\rho_{SL1}$ of the slurry between the first measurement position and the liquid level 12a, thereby completing the liquid level detection of the slurry 12. That is, in the present embodiment, the liquid level position of the slurry 12 based on the position of the second pressure sensor 52 will be detected.

As described above, according to the reactor 3 and the liquid level detecting method of the slurry 12 related to the present embodiment, the liquid level position of the slurry having three phases of gas including the synthesis gas which exists in the slurry 12 as bubbles 28, liquid and solid can be detected easily.

Further, by taking into consideration the volume fractions $\epsilon_1$ to $\epsilon_4$ of the synthesis gas and utilizing the plurality of differential pressures $\Delta P_1$ to $\Delta P_4$, to thereby detect the liquid level position of the slurry 12, the liquid level position of the slurry 12 can be detected with high precision. Moreover, by individually correcting the densities $\rho_{SL1}$ to $\rho_{SL4}$ of the slurry in the respective sections $L_1$ to $L_4$ depending on the temperatures $T_2$ to $T_5$ of the slurry 12 in the respective sections $L_1$ to $L_4$, the liquid level position of the slurry 12 can be detected with high precision, even if the temperatures of the slurry 12 when the densities $\rho_{SL1}$ to $\rho_{SL4}$ of the slurry 12 are obtained on the basis of the compositions of the slurry 12 extracted from the reactor main body 10 differ from the temperatures $T_2$ to $T_5$ of the slurry 12 within the reactor main body 10.

In addition, in the present embodiment, the densities $\rho_{SL1}$ to $\rho_{SL4}$ of the slurry 12 of the respective sections $L_1$ to $L_4$ are individually corrected depending on the temperatures $T_2$ to $T_5$ of the slurry 12 of the sections corresponding thereto. However, for example, in a case where the deviation of the temperature distribution in the slurry 12 is minute, i.e., in a case where the temperature difference in the slurry 12 is minute (for example, 2 to 3° C.), the densities $\rho_{SL1}$ to $\rho_{SL4}$ of the slurry 12 of the respective sections may be corrected depending on the measurement temperatures of the slurry 12 in arbitrary positions within the reactor main body 10. In this case, it is desirable that only one temperature sensor which measures the temperature of the slurry 12 be provided in the reactor 3.

Further, in a case where the deviation of the density distribution in the slurry 12 is minute, the slurry 12 may be extracted from an arbitrary position within the reactor main body 10, and only one density $\rho_{SL}$ of the slurry 12 may be calculated. In this case, it is desirable that the densities $\rho_{SL1}$ to $\rho_{SL4}$ in Equations (1) to (4) of the above embodiment be substituted with the above density $\rho_{SL}$. It is to be noted that the distance h can be calculated with higher precision in the equations where the individual densities $\rho_{SL1}$ to $\rho_{SL4}$ in the respective sections $L_1$ to $L_4$ are used.

In addition, in the liquid level detecting method of the slurry 12 related to the present embodiment, the distance h from the position of the second pressure sensor 52 to the liquid level 12a is obtained using the five pressure sensors 51 to 55. However, if at least three or more pressure sensors which are arranged lower than the first pressure sensor 51 and the liquid level 12a of the slurry 12 to measure the pressure of the slurry 12 are used, the distance h from the first measurement position to the liquid level 12a can be calculated similarly to the above embodiment.

That is, the volume fraction $\epsilon_n$ of the synthesis gas in each section 4 is calculated according to the following Equation (6):

$$\Delta P_n - \Delta P_{n-1} = \rho_{SLn} \times L_n \times (1-\epsilon_n) \quad (6)$$

(where n=2, 3, . . . , m−1, m, and m≧3),
on the basis of a plurality of the differential pressures $\Delta P_n$, the axial distance $L_n$ between the pressure measurement positions of the slurry 12 which are adjacent to each other, and the density $\rho_{SLn}$ of the slurry 12 in each section $L_n$. Next, similarly to the above embodiment, the volume fraction $\epsilon_1$ of the synthesis gas between the first measurement position and the liquid level 12a is Calculated by an average value of each volume fraction $\epsilon_n$ obtained by the above equations and a least-square method, etc. Also, the distance h from the first measurement position to the liquid level 12a can be calculated according to the Equation (5) of the above embodiment, on the basis of the volume fraction $\epsilon_n$, the differential pressure $\Delta P_1$, and the density $\rho_{SL1}$ of the slurry 12 between the first measurement position and the liquid level 12a.

Further, in the present embodiment, it is possible to measure or estimate slurry density, slurry volume, or catalyst concentration in a slurry bed (weight concentration and volume concentration).

Also, in a case where the deviation of the density distribution in the slurry 12 is minute, the density $\rho_{SL}$ of the slurry 12 can be calculated according to the following Equation (7):

$$\rho_{SL}=((V_{SL}-W/\rho_S)\times\rho_L+W)/V_{SL} \quad (7)$$

on the basis of the weight W of a catalyst put into the reactor 3, the true density $\rho_s$ of the catalyst, the density $\rho_L$ of the liquid hydrocarbons 122, and the slurry volume $V_{SL}$ within the reactor 3.

In addition, the slurry volume $V_{SL}$ in Equation (7) can be obtained by calculating a slurry volume $V_{SLn}$ in each section according $L_n$ the following Equation (8):

$$V_{SLn}=(1-\epsilon_n)\times V_n \quad (8)$$

(where n=2, 3, . . . , m−1, m, and m≧3),
on the basis of the inner volume $V_n$ of the reactor and the volume fraction $\epsilon_n$ of the synthesis gas corresponding to each section $L_n$, and by applying the slurry volume to the following Equation (9).

$$V_{SL}=(1-\epsilon_1)\times h\times A_1+\Sigma(1-\epsilon_n)\times V_n \quad (9)$$

(where n=2, 3, . . . , m−1, m, m≧3)
In addition, $A_1$ in Equation (9) represents the cross-sectional area of the reactor corresponding to the section $L_1$.

Meanwhile, catalyst concentration $C_S$ in the slurry bed can be calculated by the following Equation (10):

$$C_S=W/(V_{SL}\times\rho_{SL})\times 100 \quad (10),$$

on the basis of the catalyst weight W, the slurry volume $V_{SL}$, calculated by Equations (7) to (9), and the density $\rho_{SL}$ of the slurry 12.

Also, the volume fraction $\epsilon_S$ of the catalyst within the slurry bed, and the volume fraction $\epsilon_L$ of the liquid hydrocarbons are respectively obtained according to the following Equations (11) and (12), $$\epsilon_S=(W/\rho_S)/V_{SL} \quad (11),$$

$$\epsilon_L=(V_{SL}-W/\rho_S)/V_{SL} \quad (12),$$

on the basis of the catalyst weight W and the true density $\rho_S$ of the catalyst, and the slurry volume $V_{SL}$ calculated by the Equation (9).

Next, a liquid level detecting method according to a second embodiment of the present invention will be described mainly with reference to FIG. 3. In addition, in the liquid level detecting method according to the second embodiment, the liquid level position of the slurry 12 can be detected using the same reactor 3 as that of the first embodiment.

In the liquid level detecting method of the slurry 12 related to the present embodiment, the pressure $P_1$ of the synthesis gas, and the pressures $P_2$ to $P_5$ of the slurry 12 are continuously detected by the first to fifth pressure sensors 51 to 55, and the liquid level position of the slurry 12 is continuously detected in the arithmetic device 71 only on the basis of the measurement results of the first to fifth pressure sensors 51 to 55.

At the time of this detection, the pressure $P_1$ of the synthesis gas and the pressures $P_2$ to $P_5$ of the slurry 12 which are measured by the first to fifth pressure sensors 51 to 55 are input to the arithmetic device 71, and the arithmetic device 71 calculates the differential pressure $\Delta P_n$ (n=1, 2, 3, 4) between the pressure $P_1$ of the synthesis gas and each of the pressures $P_2$ to $P_5$ of the slurry 12. In addition, each of the differential pressures $\Delta P_1$ to $\Delta P_4$ is expressed by Equation (1) shown in the present embodiment.

Figure 3:
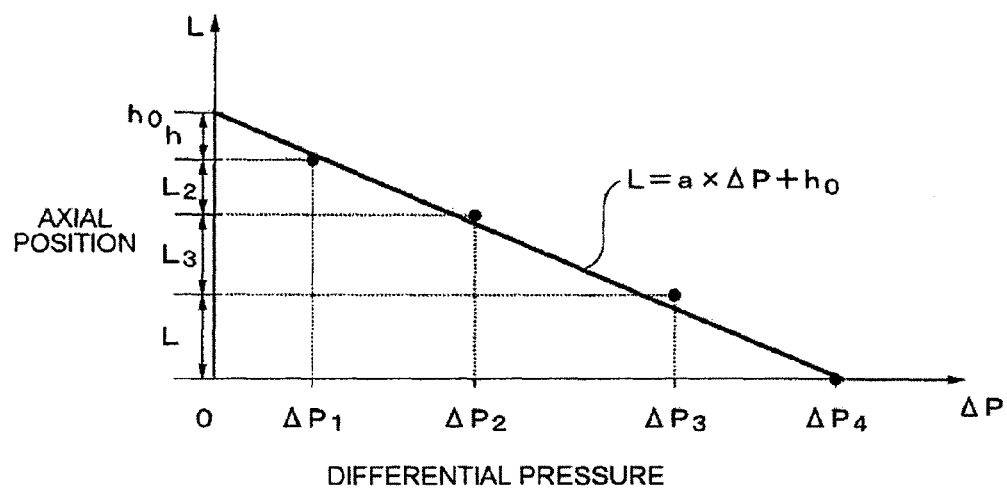
FIG. 3 is a graph showing the relationship between differential pressure and pressure measurement positions, in a liquid level detecting method according to a second embodiment of the present invention.

Also, the arithmetic device 71, as shown in, for example FIG. 3, carries out linear approximation of the relationship between the differential pressure $\Delta P$ and each of the measurement positions (axial positions) of the pressures $P_1$ to $P_5$ by the least-square method, on the basis of the measured differential pressures $\Delta P_1$ to $\Delta P_4$, and the measurement positions of the pressures $P_2$ to $P_5$ of the slurry 12, and specifies as the liquid level position of the slurry 12 the position (L=$h_0$) where the differential pressure $\Delta P$ equals 0 in the obtained linear approximation equation (L=a×$\Delta P$+$h_0$). In addition, in the graph of the illustrated example, the liquid level position of the slurry 12 is shown on the basis of the axial position of the fifth pressure sensor 55. However, the invention is not limited thereto. For example, the liquid level position of the slurry may be shown on the basis of any one of the second to fourth pressure sensors 52 to 54.

According to the liquid level detecting method of the slurry 12 related to the present embodiment, by only measuring the differential pressures $\Delta P_1$ to $\Delta P_4$ between the pressure $P_1$ of the synthesis gas, and the pressures $P_2$ to $P_5$ of the slurry 12, the liquid level position of the slurry having three phases of gas including the synthesis gas, liquid and solid can be detected easily, without consideration of influences for the density of the slurry 12, the volume fraction of the synthesis gas which exists in the slurry 12 as the bubbles 28, or the like. That is, since there is no need to provide the temperature sensors 61 to 65 in the reactor 3 used for this liquid level detecting method, the configuration of the reactor 3 can be simplified as compared with the first embodiment.

Further, since there is also no need to obtain the densities $\rho_{SL1}$ to $\rho_{SL4}$ or $\rho_{SL}$ of the slurry 12, or the volume fractions $\epsilon_1$ to $\epsilon_4$ of the synthesis gas, it becomes possible to rapidly detect the level position.

In addition, in a case where the level position is detected by the liquid level detecting method related to the present embodiment, it is desirable that the number of pressure sensors which measure the pressure of the slurry 12 be at least three or more, and it is desirable that the plurality of pressure sensors be arranged at intervals in the axial direction of the reactor main body 10.

Further, in all the embodiments, the reactor main body 10 may include a plurality of auxiliary temperature sensors which measure temperatures within the reactor main body 10 in the vicinity of the liquid level 12a in the operating state of the synthesis reaction system 1, and the plurality of auxiliary temperature sensors may be arranged side by side in the axial direction of the reactor 3. Also, the arithmetic device 71 may detect the liquid level position of the slurry 12, on the basis of the measurement results of the plurality of auxiliary temperature sensors during a period from a stopped state to an operating state.

That is, the liquid level position of the slurry 12 changes greatly during the period from a state (static state) where the synthesis gas is not supplied into the slurry 12 to a state (operating state) where the supply of the synthesis gas is started (start of operation), and the synthesis gas is stably supplied into the slurry 12. Further, the difference between the temperature of the slurry 12 and the temperature of the synthesis gas above the liquid level 12a in an operating state is large as compared with the temperature difference in the slurry 12.

Thus, by measuring the temperature within the reactor main body 10 using the plurality of auxiliary temperature sensors at the time of the start of operation as mentioned above, the change of the liquid level 12a of which the temperature change is large can be known according to the arrangement of the auxiliary temperature sensors, and whether there is in an operating state can be determined. Also, in a case where it is determined that there is in an operating state, it becomes possible to start the aforementioned liquid level detection. That is, in this configuration, the timing with which the liquid level detection of the slurry 12 is started can be obtained easily.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Industrial Applicability

The present invention relates to a bubble column type hydrocarbon synthesis reactor which synthesizes a hydrocarbon compound by a chemical reaction of a synthesis gas including hydrogen and carbon monoxide as main components, and a slurry having solid catalyst particles suspended in liquid. The hydrocarbon synthesis reactor includes a reactor main body which accommodates the slurry; a synthesis gas supplying section which supplies the synthesis gas to the slurry; one pressure sensor which is arranged higher than the liquid level of the slurry to measure the pressure of the synthesis gas above the liquid level; another pressure sensor which is arranged lower than the liquid level of the slurry to measure the pressure of the slurry; and a liquid level detecting device which detects a liquid level position of the slurry on the basis of measurement results of the pressure sensors. A plurality of the other pressure sensors are provided at arbitrary intervals in an axial direction of the reactor main body.

According to the bubble column type hydrocarbon reactor of the present invention, the liquid level position of the slurry which makes a complicated dispersed system including three phases of gas, liquid, and solid can be detected easily.

The invention claimed is:

1. A bubble column type hydrocarbon synthesis reactor for synthesizing a hydrocarbon compound by a chemical reaction of a synthesis gas including hydrogen and carbon monoxide as main components, and a slurry having solid catalyst particles suspended in liquid, the hydrocarbon synthesis reactor comprising:
   a reactor main body for accommodating the slurry;
   a synthesis gas supplying section for supplying the synthesis gas to the slurry;
   a first pressure sensor which is arranged higher than the liquid level of the slurry to measure the pressure of the synthesis gas above the liquid level;
   a plurality of second pressure sensors which are arranged lower than the liquid level of the slurry to measure the pressure of the slurry;
   temperature sensors for measuring temperatures of the slurry; and
   a liquid level detecting device for detecting a liquid level position of the slurry on the basis of measurement results of the first and second pressure sensors,
   wherein the plurality of second pressure sensors are provided at arbitrary intervals in an axial direction of the reactor main body,
   wherein the temperature sensors are respectively provided within sections existing between the second pressure sensors adjacent to each other in the reactor main body, and
   wherein the liquid level detecting device is configured to individually correct the density of the slurry obtained on the basis of the composition of the slurry within each of the sections, on the basis of a measurement result of the temperature sensor arranged in the section corresponding to the density, and detect the liquid level position of the slurry on the basis of the corrected density of the slurry and the measurement results of the first and second pressure sensors.

2. The bubble column type hydrocarbon reactor according to claim 1, further comprising:
   a plurality of auxiliary temperature sensors for measuring temperatures within the reactor main body, wherein the plurality of auxiliary temperature sensors are arranged side by side in the axial direction of the reactor main body, in the vicinity of the liquid level in a state where the synthesis gas is stably supplied to the slurry by the synthesis gas supplying section, and
   wherein the liquid level detecting device is configured to detect the liquid level position of the slurry on the basis of measurement results of the plurality of auxiliary temperature sensors during a period from a state where the synthesis gas is not supplied into the slurry to a state where the supply of the synthesis gas is started and the synthesis gas is stably supplied into the slurry.

3. A slurry level detecting method of, when a synthesis gas including hydrogen and carbon monoxide as main components and a slurry having solid catalyst particles suspended in liquid are chemically reacted to synthesize a hydrocarbon compound, detecting a liquid level position of the slurry accommodated in the reactor main body, the method comprising the steps of:
   measuring a differential pressures $\Delta P_n$ (n and m are positive integers, n=1, 2, ..., m−1, and m, and m≧3) between the pressure of the synthesis gas above the liquid level of the slurry and the pressures of the slurry at a plurality of depth positions which are different from the liquid level;
   calculating a volume fraction $\epsilon_n$ of the synthesis gas between the pressure measurement positions of the slurry which are adjacent to each other, according to the following Equation:

$$\Delta P_n - \Delta P_{n-1} = \rho_{SLn} \times L_n \times (1-\epsilon_n),$$

n and m are positive integers, n =2, 3, ..., m−1, m, on the basis of a plurality of the differential pressures $\Delta P_n$, the axial distance $L_n$ between the pressure measurement positions of the slurry which are adjacent to each other, and the density $\rho_{SLn}$ of the slurry between the pressure measurement positions of the slurry which are adjacent to each other, on the definition that a differential pressure between the pressure of the synthesis gas and the pressure of the slurry measured in a first measurement position nearest from the liquid level is defined as $\Delta P_1$, and as "n" is greater, the depth from the liquid level becomes greater;
   obtaining a volume fraction $\epsilon_1$ of the synthesis gas between the first measurement position and the liquid level on the basis of the volume fraction $\epsilon_n$ of the synthesis gas; and
   obtaining a distance h from the first measurement position to the liquid level according to the following Equation:

$$\Delta P_1 = \rho_{SL1} \times h \times (1-\epsilon_1),$$

on the basis of the volume fraction $\epsilon_1$, the differential pressure $\Delta P_1$, and the density $\rho_{SL1}$ of the slurry between the first measurement position and the liquid level.

4. The slurry level detecting method according to claim 3, wherein the density of the slurry is obtained on the basis of the composition of the slurry and the temperature of the slurry is measured, and the density of the slurry is corrected on the basis of the temperature of the slurry.

5. The slurry level detecting method according to claim 3, wherein the density of the slurry is obtained on the basis of the composition of the slurry and the temperature of the slurry is measured, in every section existing between the pressure measurement positions of the slurry which are adjacent to each other in the reactor main body, and on the basis of the temperature of the slurry in each section, the density of the slurry in the section corresponding to the temperature is corrected individually.

* * * * *

UNITED STATES PATENT AND TRADEMARK OFFICE
CERTIFICATE OF CORRECTION

PATENT NO. : 8,479,572 B2
APPLICATION NO. : 12/733892
DATED : July 9, 2013
INVENTOR(S) : Yasuhiro Onishi et al.

It is certified that error appears in the above-identified patent and that said Letters Patent is hereby corrected as shown below:

In the Specifications

Column 3, line 8, change "$\epsilon_n$" to -- $\varepsilon_n$ --;

Column 3, line 12, change "$\Delta P_n - \Delta P_{n-1} = \rho_{SLn} \times L_n \times (1 - \epsilon_n)$" to -- $\Delta P_n - \Delta P_{n-1} = \rho_{SLn} \times L_n \times (1 - \varepsilon_n)$ --;

Column 3, line 23, change "$\epsilon_1$" to -- $\varepsilon_1$ --;

Column 3, line 25, change "$\epsilon_n$" to -- $\varepsilon_n$ --;

Column 3, line 30, change "$\Delta P_1 = \rho_{SL1} \times h \times (1 - \epsilon_1)$," to -- $\Delta P_1 = \rho_{SL1} \times h \times (1 - \varepsilon_1)$, --;

Column 9, line 34, change "$\epsilon_2, \epsilon_3,$ and $\epsilon_4$" to -- $\varepsilon_2, \varepsilon_3,$ and $\varepsilon_4$ --;

Column 9, line 37, change "$\Delta P_2 - \Delta P_1 = \rho_{SL2} \times L_2 \times (1 - \epsilon_2)$" to -- $\Delta P_2 - \Delta P_1 = \rho_{SL2} \times L_2 \times (1 - \varepsilon_2)$ --;

Column 9, line 39, change "$\Delta P_3 - \Delta P_2 = \rho_{SL3} \times L_3 \times (1 - \epsilon_3)$" to -- $\Delta P_3 - \Delta P_2 = \rho_{SL3} \times L_3 \times (1 - \varepsilon_3)$ --;

Column 9, line 41, change "$\Delta P_4 - \Delta P_3 = \rho_{SL4} \times L_4 \times (1 - \epsilon_4)$" to -- $\Delta P_4 - \Delta P_3 = \rho_{SL4} \times L_4 \times (1 - \varepsilon_4)$ --;

Column 9, line 48, change "$\epsilon_1$" to -- $\varepsilon_1$ --;

Column 9, line 57, change "$\Delta P_1 = \rho_{SL1} \times h \times (1 - \epsilon_1)$" to -- $\Delta P_1 = \rho_{SL1} \times h \times (1 - \varepsilon_1)$ --.

Signed and Sealed this
Eleventh Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,479,572 B2
APPLICATION NO. : 12/733892
DATED : July 9, 2013
INVENTOR(S) : Yasuhiro Onishi et al.

It is certified that error appears in the above-identified patent and that said Letters Patent is hereby corrected as shown below:

In the Specifications

Column 3, line 8, change "$\epsilon_n$" to -- $\varepsilon_n$ --;

Column 3, line 12, change "$\Delta P_n - AP_{n-1} = \rho_{SLn} \times L_n \times (1 - \epsilon_n)$"
to -- $\Delta P_n - \Delta P_{n\ 1} = \rho_{SLn} \times L_n \times (1 - \varepsilon_n)$ --;

Column 3, line 23, change "$\epsilon_1$" to -- $\varepsilon_1$ --;

Column 3, line 25, change "$\epsilon_n$" to -- $\varepsilon_n$ --;

Column 3, line 30, change "$\Delta P_1 = \rho_{SL1} \times h \times (1 - \epsilon_1)$," to -- $\Delta P_1 = \rho_{SL1} \times h \times (1 - \varepsilon_1)$, --;

Column 9, line 34, change "$\epsilon_2, \epsilon_3,$ and $\epsilon_4$" to -- $\varepsilon_2, \varepsilon_3,$ and $\varepsilon_4$ --;

Column 9, line 37, change "$\Delta P_2 - \Delta P_1 = \rho_{SL2} \times L_2 {}^\times (1 - \epsilon_2)$" to -- $\Delta P_2 - \Delta P_1 = \rho_{SL2} \times L_2 \times (1 - \varepsilon_2)$ --;

Column 9, line 39, change "$\Delta P_3 - \Delta P_2 = \rho_{SL3} \times L_3 \times (1 - \epsilon_3)$"
to -- $\Delta P_3 - \Delta P_2 = \rho_{SL3} \times L_3 \times (1 - \varepsilon_3)$ --;

Column 9, line 41, change "$\Delta P_4 - \Delta P_3 = \rho_{SL4} \times L_4 \times (1 - \epsilon_4)$" to -- $\Delta P_4 - \Delta P_3 = \rho_{SL4} \times L_4 \times (1 - \varepsilon_4)$ --;

Column 9, line 48, change "$\epsilon_1$" to -- $\varepsilon_1$ --;

Column 9, line 57, change "$\Delta P_1 = \rho_{SL1} \times h \times (1 - \epsilon_1)$" to -- $\Delta P_1 = \rho_{SL1} \times h \times (1 - \varepsilon_1)$ --;

Column 10, line 5, change "$\epsilon_1$ to $\epsilon_4$" to -- $\varepsilon_1$ to $\varepsilon_4$ --;

This certificate supersedes the Certificate of Correction issued March 11, 2014.

Signed and Sealed this
Seventh Day of October, 2014

Michelle K. Lee
*Deputy Director of the United States Patent and Trademark Office*

CERTIFICATE OF CORRECTION (continued)
U.S. Pat. No. 8,479,572 B2

Column 10, line 52, change "$\epsilon_n$" to -- $\varepsilon_n$ --;

Column 10, line 53, change "section 4" to -- section $L_n$ --;

Column 10, line 56, change "$\Delta P_n - \Delta P_{n-1} = \rho_{SLn} \times L_n \times (1 - \epsilon_n)$" to -- $\Delta P_n - \Delta P_{n-1} = \rho_{SLn} \times L_n \times (1 - \varepsilon_n)$ --;

Column 10, line 62, change "$\epsilon_1$" to -- $\varepsilon_1$ --;

Column 10, line 64, change "is Calculated " to -- is calculated --;

Column 10, line 65, change "$\epsilon_n$" to -- $\varepsilon_n$ --;

Column 11, line 2, change "$\epsilon_n$" to -- $\varepsilon_n$ --;

Column 11, line 22, change "$V_{SLn} = (1 - \epsilon_n) \times V_n$" to -- $V_{SLn} = (1 - \varepsilon_n) \times V_n$ --;

Column 11, line 25, change "$\epsilon_n$" to -- $\varepsilon_n$ --;

Column 11, line 29, change "$V_{SL} = (1 - \epsilon_1) \times h \times A_1 + \Sigma(1 - \epsilon_n) \times V_n$" to -- $V_{SL} = (1 - \varepsilon_1) \times h \times A_1 + \Sigma(1 - \varepsilon_n) \times V_n$ --;

Column 11, line 39, change "$\epsilon_s$" to -- $\varepsilon_s$ --;

Column 11, line 40, change "$\epsilon_L$" to -- $\varepsilon_L$ --;

Column 11, line 44, change "$\epsilon_S = (W/\rho_S)/V_{SL}$" to -- $\varepsilon_S = (W/\rho_S)/V_{SL}$ --;

Column 11, line 46, change "$\epsilon_L = (V_{SL} - W/\rho_S)/V_{SL}$" to -- $\varepsilon_L = (V_{SL} - W/\rho_S)/V_{SL}$ --;

Column 12, line 37, change "$\epsilon_1$" to -- $\varepsilon_1$ --;

Column 12, line 38, change "$\epsilon_4$" to -- $\varepsilon_4$ --;

Column 14, line 43, change "$\epsilon_n$" to -- $\varepsilon_n$ --;

Column 14, line 47, change "$\Delta P_n - \Delta P_{n-1} = \rho_{SLn} \times L_n \times (1 - \epsilon_n),$" to -- $\Delta P_n - \Delta P_{n-1} = \rho_{SLn} \times L_n \times (1 - \varepsilon_n),$ --;

Column 14, line 61, change "$\epsilon_1$" to -- $\varepsilon_1$ --;

Column 14, line 63, change "$\epsilon_n$" to -- $\varepsilon_n$ --;

Column 14, line 67, change "$\Delta P_1 = \rho_{SL1} \times h \times (1 - \epsilon_1),$" to -- $\Delta P_1 = \rho_{SL1} \times h \times (1 - \varepsilon_1),$ --;

CERTIFICATE OF CORRECTION (continued)
U.S. Pat. No. 8,479,572 B2

Column 15, line 1, change "$\epsilon_1$" to -- $\varepsilon_1$ --;

Column 15, line 2, change "$\rho_{SLI}$" to -- $\rho_{SL1}$ --.

UNITED STATES PATENT AND TRADEMARK OFFICE
CERTIFICATE OF CORRECTION

PATENT NO. : 8,479,572 B2  Page 1 of 1
APPLICATION NO. : 12/733892
DATED : July 9, 2013
INVENTOR(S) : Onishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 535 days.

Signed and Sealed this
Eighth Day of September, 2015

Michelle K. Lee
*Director of the United States Patent and Trademark Office*